Aug. 18, 1931. G. C. BEIDLER 1,819,065
PHOTOGRAPHIC FOCUS INDICATOR
Filed Nov. 12, 1930 2 Sheets-Sheet 1
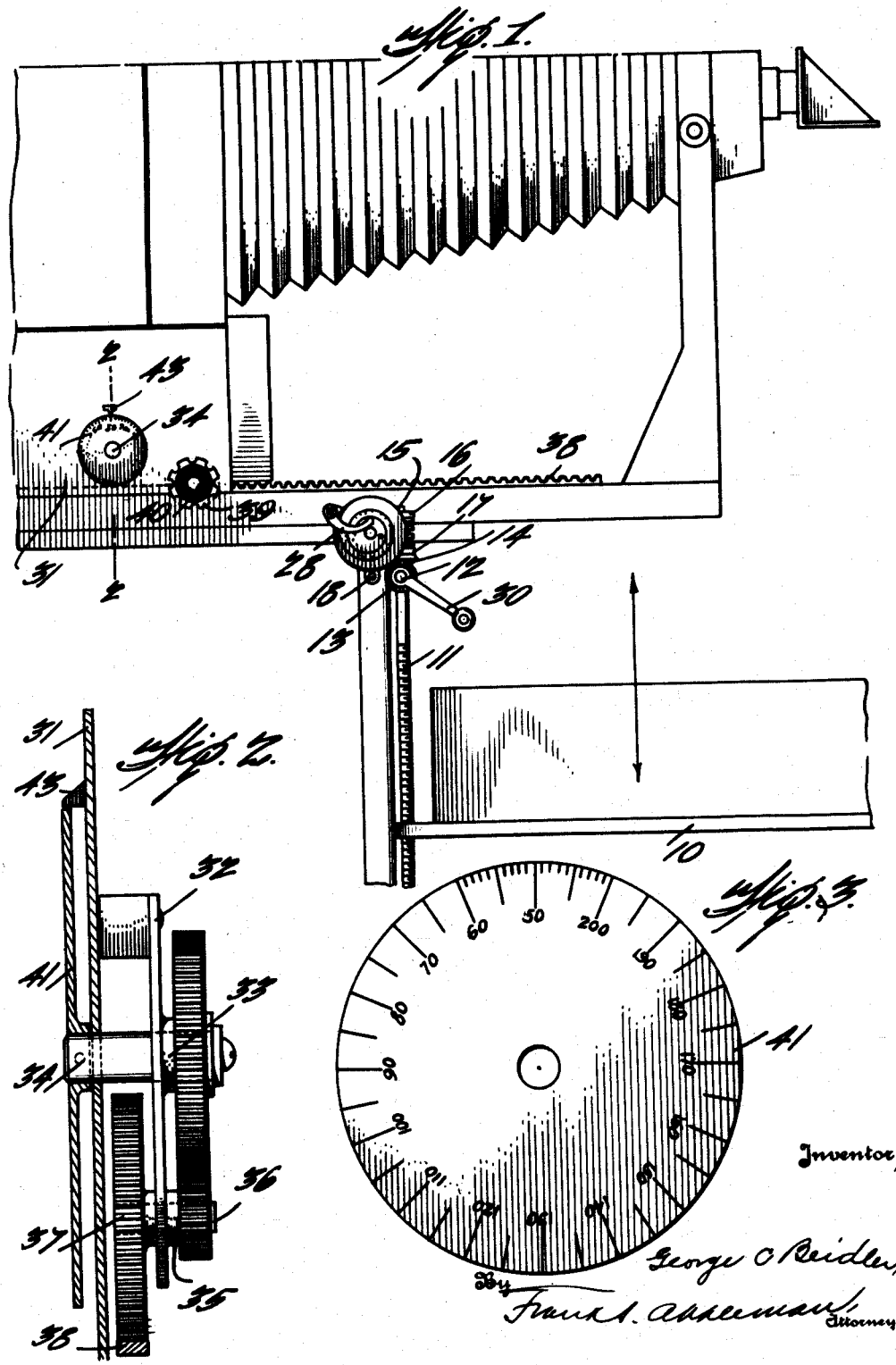

Aug. 18, 1931.  G. C. BEIDLER  1,819,065
PHOTOGRAPHIC FOCUS INDICATOR
Filed Nov. 12, 1930   2 Sheets-Sheet 2
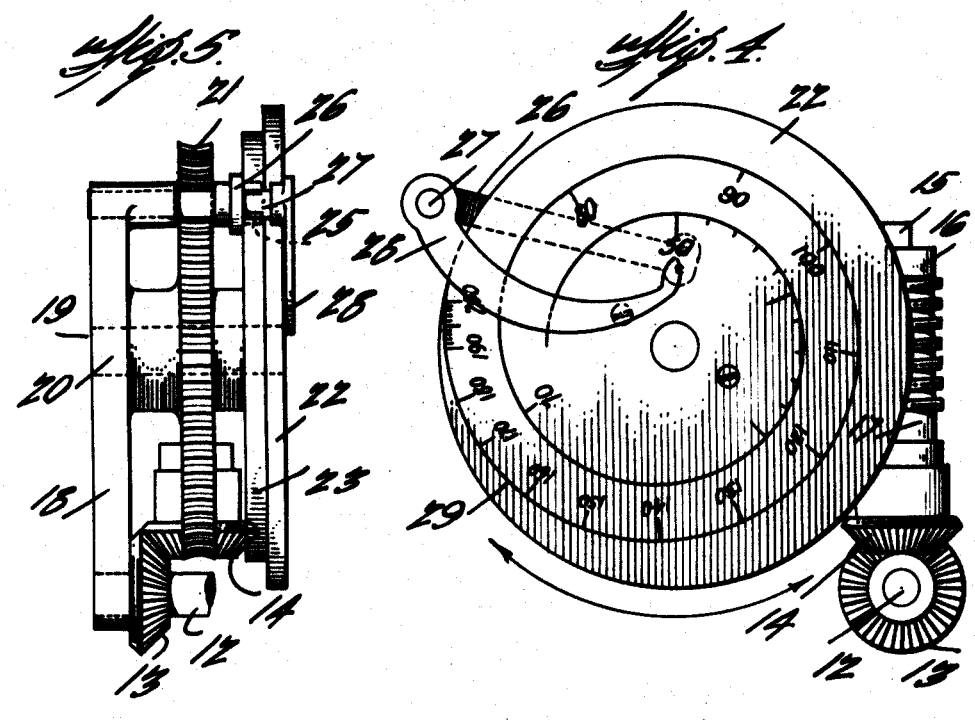
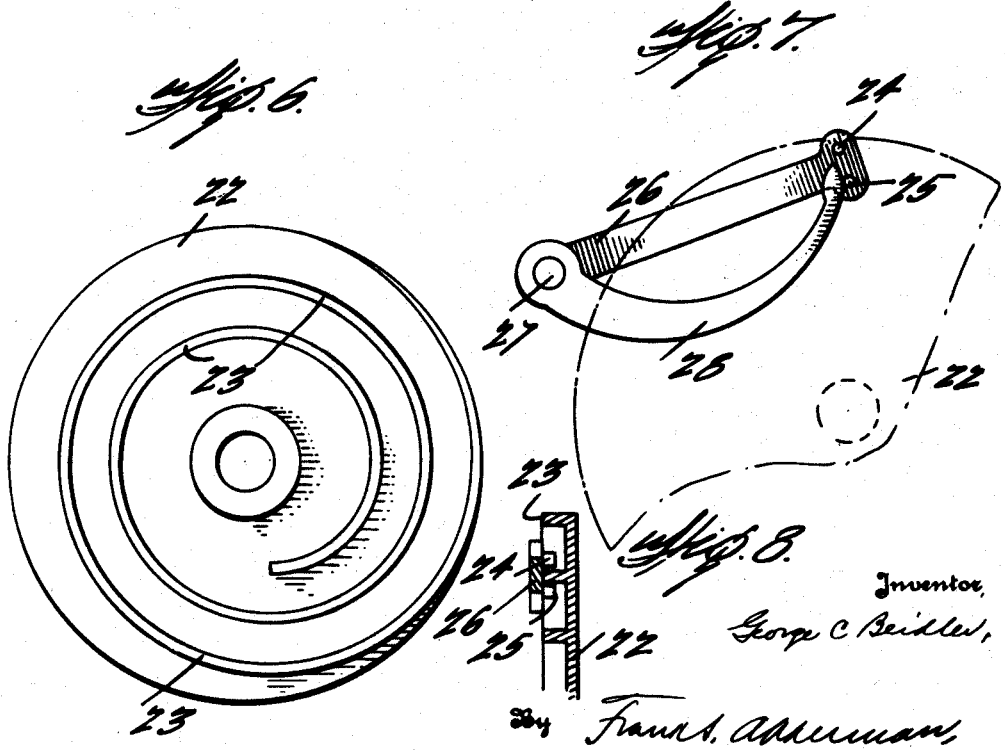
Inventor,
George C. Beidler,
By Frank A. Alderman,
Attorney.

Patented Aug. 18, 1931

1,819,065

UNITED STATES PATENT OFFICE

GEORGE C. BEIDLER, OF ROCHESTER, NEW YORK

PHOTOGRAPHIC FOCUS INDICATOR.

Application filed November 12, 1930. Serial No. 495,236.

This invention relates to improvements in photographic apparatus, and has for an object the provision of means for automatically determining the position of an object to be photographed with its relation to the projecting means and the sensitized element to be affected by a projected light.

It is an object of this invention to provide a novel indicator for determining the position of a copy with relation to the projecting means for reproducing determined sizes; and it is furthermore an object to provide a co-related indicating means for properly positioning the sensitized element with relation to the projecting means in order that the indicated size of the reproduction will be realized.

In carrying the invention into practice and for convenience in calculating, graduations have been adopted, the reading of which will disclose whether the picture will be one hundred per cent, fifty per cent or two hundred per cent as to size of the original and, of course, proportionate sizes between those just mentioned. Consequently the graduations of respective dials of the copy holder and the exposing chamber are arbitrarily employed, as will presently appear.

It is an object of the invention furthermore to provide novel means whereby mechanism employed for positioning the copy holder in proper relation to the projecting means will operate a register to indicate the proportionate size of the reproduction, and likewise to provide means associated with and actuated by movement of the holder of the sensitized element when it is adjusted with relation to the projecting means so that the operator will know when the proper relative adjustments have been made.

It is a still further object of the invention to provide means for communicating the motion of the means for adjusting the copy holder to the said indicator, and also to provide means for communicating motion of the sensitized holder to said other indicator.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which—

Figure 1 illustrates a view in elevation of a fragment of a copy holder and a fragment of photographic camera, showing mechanism embodying the invention associated therewith;

Figure 2 illustrates a sectional view on the line 2—2 of Fig. 1;

Figure 3 illustrates an enlarged view of one of the dials;

Figure 4 illustrates a front elevation of the indicator;

Figure 5 illustrates a view of the mechanism at right angles to that shown in Figure 4;

Figure 6 illustrates a view in elevation of the rear face of one of the elements;

Figure 7 illustrates a detail view of the indicator; and

Figure 8 illustrates a sectional view thereof.

In these drawings 10 denotes a copy holder having the conventional type of worm screw for accomplishing its vertical adjustment. In this type of adjusting device, a transversely disposed shaft 12 is provided with beveled gear wheels which engage like gear wheels on the screws 11 to turn them, and applicant has associated with these features a beveled gear wheel 13 on said shaft which meshes with a beveled gear wheel 14 on a worm shaft 15, which worm shaft is journaled in suitable bearings 16 and 17 carried by a bracket 18 secured to a frame of a machine of this type in suitable manner. The bracket has a properly located bearing 19 for a shaft 20 on which a worm wheel 21 is rotative, the said worm wheel being engaged by the worm and it may rotate in alternate directions, as shown by the arrow in Figure 4. A disk 22 is likewise secured on the shaft 20 and it rotates with it, the said disk having a spiral flange 23 on its face which is engaged by spaced pins 24 and 25 on an arm 26. The arm 26 has a shaft or trunnions 27 oscillatively carried by the bracket 18, and the relation of parts is such that the arm 26 is moved as the spiral is rotated under the influence of the means heretofore described.

An indicator or pointer 28 is mounted on the shaft 27 and it moves in unison with the arm 26, but the indicator is in spaced relation to the arm and moves over the outer face of the disk 22 which is provided with a dial 29 having a spiral scale, the volutions of which correspond to those of the spiral flange. The scale, in the present embodiment of the invention, is numbered progressively from 50 to 200 and the relation of parts is such that when the pointer is at the number 50 the reproduction of the copy held by the copy holder will be one-half the size, whereas when the pointer is at the number 200 the copy will be twice the size of the original and, obviously, the sizes between will be indicated by the other numbers. It is obvious, therefore, from an inspection of the drawings and the foregoing description that when the crank 30 is rotated to turn the shaft 12 motion will be communicated to the copy holder and it may be lowered or raised, according to the direction of rotation of the said crank. Through the employment of the gearing, worm wheel, worm, etc., the spiral disk will be rotated and the arm and indicator or pointer will be moved in synchronism therewith in order that the pointer will denote the size of the picture which will result from an exposure of the copy at the location occupied by the copy holder.

In order, however, to have the photographic apparatus function properly, it is desirable that the exposing chamber having the sensitized element be positioned in corresponding relation to the light projecting means and, to that end, the casing 31 has a plate 32 secured to it on its inner surface, the said plate having a bearing 33 for a shaft 34 which extends through the casing to its exterior. The plate 32 furthermore has a bearing 35 for a shaft 36. A pinion 37 is mounted on the shaft 36 and its teeth engage a rack 38, such as is common in this type of machines, for moving the exposing chamber with relation to the projecting means. In this type of machine a hand wheel 39 is usually employed which turns the shaft 40 having pinions (not shown) that engage the teeth of the rack, such as 38. By the turning of the hand wheel 39 the position of the exposing chamber is adjusted and, in order to communicate this motion to the indicating means, the elements identified by the numerals 32 to 38, inclusive, have been incorporated as part of the mechanism for accomplishing the result.

The outer end of the shaft 34 is provided with a dial 41, which dial rotates with the shaft, and the dial has graduations corresponding in values to those of the graduations of the dial on the disk 22. The dial 41 is rotative with relation to a pointer or indicator 43 so that when a number on the dial 41 is in alinement with the indicator 43 and the pointer 28 is in registry with a corresponding number on the other dial, the apparatus is in focus and the reproduction will be of the size with respect to the original indicated by the said numbers.

I claim:

1. In a photographic apparatus, an adjustable film holder operably associated with light projecting means, a copy holder mounted to move toward and from the light projecting means, means for moving said copy holder, a rotative member having a spiral guide, means for moving the rotative member and the copy holder proportionally, a dial carried by the rotative member having spirally arranged indicia on its face, the spiral of which coincides approximately with the spiral guide, an oscillative member having means engaging the spiral guide, whereby the oscillative member is moved, a pivot for the oscillative member, a member moved in unison with the oscillative member projecting into operative relation with the indicia on the dial of the rotative member, means operated by the movement of the film holder, a dial having indicia on its face corresponding to the indicia on the rotative member rotated by the last mentioned means, and an indicator with relation to which the dial rotates whereby the respective numbers on the dials denote the proportional size of the picture and copy.

2. In a photographic apparatus, an adjustable film holder operably associated with light projecting means, a copy holder mounted to move toward and from the light projecting means, a rotative member operatively connected to communicate the aforesaid motion to the copy holder, a worm, means on the rotative member for turning the worm, a worm wheel rotated by the worm, a disk having a spiral guide, means for mounting the worm and disk whereby they rotate in unison, a dial carried by the disk having spirally arranged indicia on its face, the spiral of which coincides approximately with the spiral guide of the disk, an oscillative member having means engaging the spiral guide for moving the oscillative member, a pivot for the oscillative member, a member moved in unison with the oscillative member projecting into operative relation with the indicia on the aforesaid dial, means operated by the movement of the film holder, a rotatively mounted dial turned by the last mentioned means, said dial having indicia on its face corresponding numerically with the indicia on the first mentioned dial, an indicator with relation to which the dial rotates, whereby the respective numbers on the dials denote the proportional size of the picture and copy when the apparatus is in focus.

3. In a photographic apparatus, an adjustable film holder operably associated with light projecting means, a copy holder mounted to move toward and from the light projecting means, a rotative member operatively connected to communicate the aforesaid motion to the copy holder, a worm, means on the rotative member for turning the worm, a worm wheel rotated by the worm, a disk having a spiral guide, means for mounting the worm and disk whereby they rotate in unison, a dial carried by the disk having spirally arranged indicia on its face, the spiral of which coincides approximately with the spiral guide of the disk, an oscillative member having means engaging the spiral guide for moving the oscillative member, a pivot for the oscillative member, a member moved in unison with the oscillative member projecting into operative relation with the indicia on the aforesaid dial, a rack with relation to which the film holder is movable, rotative mechanism mounted on the film holder engaged by the rack, a dial connected to the rotative means and taking rotary motion therefrom, a dial having indicia on its face corresponding numerically with the indicia on the first mentioned dial, an indicator with relation to which the second mentioned dial rotates, whereby the respective numbers on the dials with their indicators will denote the proportional size of the picture and copy.

4. In a photographic apparatus, an adjustable film holder operably associated with light projecting means, a copy holder mounted to move toward and from the light projecting means, means for moving said copy holder, a rotative member having a spiral guide, means for turning the rotative member and moving the copy holder proportionally, a dial carried by the rotative member having spirally arranged numerical indicia on its face, the spiral of which coincides approximately with the spiral guide, an oscillatively mounted member having means engaging the spiral guide, whereby the oscillative member is moved, a member having means whereby it is moved in unison with the oscillative member, projecting into operative relation with the indicia on the dial of the rotative member, means operated by the movement of the film holder, a dial having numerical indicia on its face corresponding to the indicia on the rotative member rotated by the last mentioned means, an indicator with relation to which the last mentioned dial rotates, whereby the respective numbers of the dials and indicators register the size of the picture proportional to the copy.

5. In a photographic apparatus, an adjustable film holder operably associated with light projecting means, a copy holder mounted to move toward and from the light projecting means, means for moving said copy holder, a rotative member having a spiral guide, means for turning the rotative member and moving the copy holder proportionally, a dial carried by the rotative member having spirally arranged numerical indicia on its face, the spiral of which coincides approximately with the spiral guide, an oscillatively mounted member having means engaging the spiral guide, whereby the oscillative member is moved, a member having means whereby it is moved in unison with the oscillative member, projecting into operative relation with the indicia on the dial of the rotative member, a stationary rack with relation to which the film holder moves, a gear mounting on the film holder, gearing mounted thereon, one element of which engages the rack for driving the gearing, a dial having numerical indicia on its face corresponding to the indicia on the rotative member rotated by the gearing, an indicator with relation to which the last mentioned dial rotates, whereby the respective numbers of the dials and indicators register the size of the picture proportional to the copy.

GEORGE C. BEIDLER.